United States Patent
Berger

Patent Number: 6,165,577
Date of Patent: Dec. 26, 2000

[54] MAGNETIC LATCHING SYSTEM FOR PROTECTIVE TABLETOP PADS

[76] Inventor: David Berger, 4833 N. Meridian, Indianapolis, Ind. 46208

[21] Appl. No.: 09/494,164

[22] Filed: Jan. 31, 2000

[51] Int. Cl.$^7$ ................................................. B32B 3/06
[52] U.S. Cl. .............................. 428/58; 428/60; 428/900; 248/346.01; 248/346.3
[58] Field of Search ................................ 428/58, 60, 44, 428/900; 248/346.3, 346.01

[56] References Cited

U.S. PATENT DOCUMENTS

| | | |
|---|---|---|
| D. 373,043 | 8/1996 | Zumbo et al. . |
| 3,827,019 | 7/1974 | Serbu . |
| 3,924,212 | 12/1975 | Brown . |
| 4,517,232 | 5/1985 | Krauser . |
| 5,476,701 | 12/1995 | Berger . |
| 5,782,512 | 7/1998 | Cargnoni . |

*Primary Examiner*—Alexander S. Thomas

[57] ABSTRACT

A magnetic latching system for protective tabletop pads for providing a convenient and secure latching system for removably connecting pad sections together in a manner that minimizes the risk of damaging the tabletop. A tabletop protective pad section is provided for resting on a top surface of a table with at least one other pad section. The preferred protective pad section comprises a base member having a first face for facing in an upward direction and a second face for facing in a downward direction, with the first and second faces being oriented substantially parallel to each other. Each of the first and second faces has a perimeter, and the base member has a perimeter edge face extending between the perimeters of the first and second faces. A pair of side portions of the perimeter edge face are oriented generally parallel to each other on opposite sides of the base member. A magnetically-active structure is mounted on the first side portion of the perimeter edge face of the base member, and a magnetically-receptive structure is mounted on the second side portion of the perimeter edge face of the base member. The magnetically-active structure of the first side portion of a first one of the pad sections is magnetically couplable to the magnetically-receptive structure of the second side portion of a second one of the pad sections for removably holding the first and second pad sections in an adjacent condition.

19 Claims, 3 Drawing Sheets

MAGNETIC LATCHING SYSTEM FOR PROTECTIVE TABLETOP PADS

BACKGROUND OF THE INVENTION

1. Field of the Invention

The present invention relates to protective tabletop pads and more particularly pertains to a new magnetic latching system for protective tabletop pads for providing a convenient and secure latching system for removably connecting pad sections together in a manner that greatly minimizes the risk of damaging the tabletop.

2. Description of the Prior Art

Protective pads are known in the prior art and are available as a custom manufactured product from many sources. The primary purpose of such pads is to provide protection to items of fine furniture, when, for example, warm or hot dishes are placed on the furniture in its normal use. The pads are most often used on tabletops, although other items of fine furniture may benefit from the use of such pads. The pads are often manufactured in sections so that they may be produced in sizes that cover the entire top surface of a large table, and then subsequently can be folded or collapsed into a more compact size for carrying and storage of the sections when the tabletop pad is not in use, and it is desirable to display the tabletop. The overall perimeter shape of the pads are usually designed to closely match the perimeter contours of the tabletop so that a smooth top surface is presented.

The pads usually have a soft bottom surface that will not mar the tabletop and a durable top surface that can withstand the rigors of normal table use. Since the tabletop surface is usually highly polished, the pads may slip on the tabletop surface since the soft bottom surface of the pad typically does not have a high coefficient of friction for resisting such slippage. If one of the pad sections slips, an opening occurs between the pad sections and the tabletop surface is undesirably exposed. This shifting can expose the tabletop to damage, and creates an unevenness in the top surface that may in fact cause spillage of containers on the top surface onto the exposed table surface.

As a result, several manufacturers have attempted to solve the problem by devising apparatus' intended to lock the pad sections together so that the pad sections do not separate during normal use. One such attempt is a system disclosed in U.S. Pat. No. 4,517,232. A latching system corresponding to the disclosure of this patent is available under the tradename INTERLOK from the Ohio Table Pad Company of LaGrange, Ind. Generally, this system consists of two U-shaped plastic pieces with an index notch that aligns the sections of the tabletop pad. One of the pad sections must be lifted and then dropped into the mating member. The disadvantage of this system is the difficulty of the latching procedure and the additional time required for the latching procedure. Significantly, there is the possibility of scratching the tabletop surface if the plastic locking tab is accidentally dragged across the table surface, so that the latching system itself can become a source of damage to the tabletop. Additionally, if one of the pads is improperly lifted when disengaging the pads for storage, the plastic piece may break and be rendered useless.

Another known system is available under the tradename PIVOT LOC from Sentry Table Pad Co. of St. Paul, Minn. Their latching system uses a hook and peg apparatus. This apparatus is referred to as a "lock" formed of "unbreakable" nylon. A user of this apparatus must set each latching element individually, thereby increasing the time required to install the tabletop pad sections. This apparatus also presents a table-scratching hazard if the plastic apparatus is accidentally dragged across the top surface of the table. In addition, the plastic hooks are subject to breakage if the pads are improperly lifted when disengaging the pads for storage.

Previously, the assignee of the present invention has employed a locking system that uses hook and loop fasteners, such as fasteners sold under the tradename VEL-CRO. In this locking system, L-shaped mounting pieces are inserted and glued into grooves on the pad edge and the hook and loop fastener elements are glued to the mounting pieces. The pads easily and conveniently lock together when the hook and loop fastener elements are brought into abutment. While this provides a highly suitable solution to the problem, there still exists a small possibility for damage of the tabletop if the pad sections are improperly lifted when disengaging the hook and loop fastener elements of the pad sections after use. Additionally, the L-shaped mounting pieces are subject to being pulled out of the groove when the hook and loop fastener elements of adjacent pad sections are disengaged, thereby rendering the mounting pieces ineffective and, more importantly, making them a potential tabletop-scratching hazard.

Therefore, there is a need for a tabletop pad locking system that does not require individual setting of the locking elements, a pad locking system that firmly and securely holds the pads together, and a pad locking system whose elements are protected in such a way that the risk of accidental scratching of the tabletop surface is minimal or even non-existent.

SUMMARY OF THE INVENTION

In view of the foregoing disadvantages inherent in the known types of protective tabletop pads now present in the prior art, the present invention provides a new magnetic latching system for protective tabletop pads construction wherein the same can be utilized for providing a convenient and secure latching system for removably connecting pad sections together in a manner that greatly minimizes the risk of damaging the tabletop.

To attain this, the present invention generally comprises a tabletop protective pad section for resting on a top surface of a table with at least one other pad section. The preferred protective pad section comprises a base member having a first face for facing in an upward direction such that dishes may be rested on the first face. The base member also has a second face for facing in a downward direction toward or facing the top surface of the table, with the first and second faces being oriented substantially parallel to each other. Each of the first and second faces has a perimeter, and the base member has a perimeter edge face extending between the perimeters of the first and second faces. A pair of side portions of the perimeter edge face are oriented generally parallel to each other on opposite sides of the base member. A magnetically-active structure is mounted on the first side portion of the perimeter edge face of the base member, and a magnetically-receptive structure is mounted on the second side portion of the perimeter edge face of the base member. The magnetically-active structure of the first side portion of a first one of the pad sections is magnetically couplable to the magnetically-receptive structure of the second side portion of a second one of the pad sections for removably holding the first and second pad sections in an adjacent condition.

The base member may be provided with a groove extending along the perimeter edge face in a generally parallel orientation to the perimeters of the first and second faces. A first one of the side portions of the perimeter edge face may have a first portion of the groove and a second one of the side portions of the perimeter edge face may have a second portion of the groove. The groove may extend between a first strip and a second strip of the perimeter edge face. The first strip is located adjacent to the first face between the perimeter of the first face and the groove, and the second strip is located adjacent to the second face between the perimeter of the second face and the groove. The first strip of the perimeter edge face defines a first plane, and the second strip of the perimeter edge face defines a second plane. The first plane may extend further from a center of the base member than the second plane such that the first strip protrudes further than the second strip from the base member.

The first face of the base member may be adapted for having dishes or other food serving items rested thereon, and a first sheet covers the first face. The first sheet may comprise a waterproof material. The second face of the base member may be adapted for resting on the top surface of the table without damaging the top surface of the table, and a second sheet covers the second face. The second sheet may comprise a low abrasion material. The second sheet may enclose the magnetically active structure and the magnetically-receptive structure such that the structures are physically isolated from contact with the top surface of the table when the pad section is rested on the table.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Accordingly, it is a general object of the invention to provide a novel and improved tabletop protection pad locking system that is easy and convenient for the user to employ and that will not scratch the tabletop finish.

A more specific object is to provide a tabletop protective pad locking system that is highly useable in that the system does not require complex instructions, nor complex reasoning, to implement the system.

A related object is to provide a tabletop protective pad locking system that is simple to manufacture at low cost.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
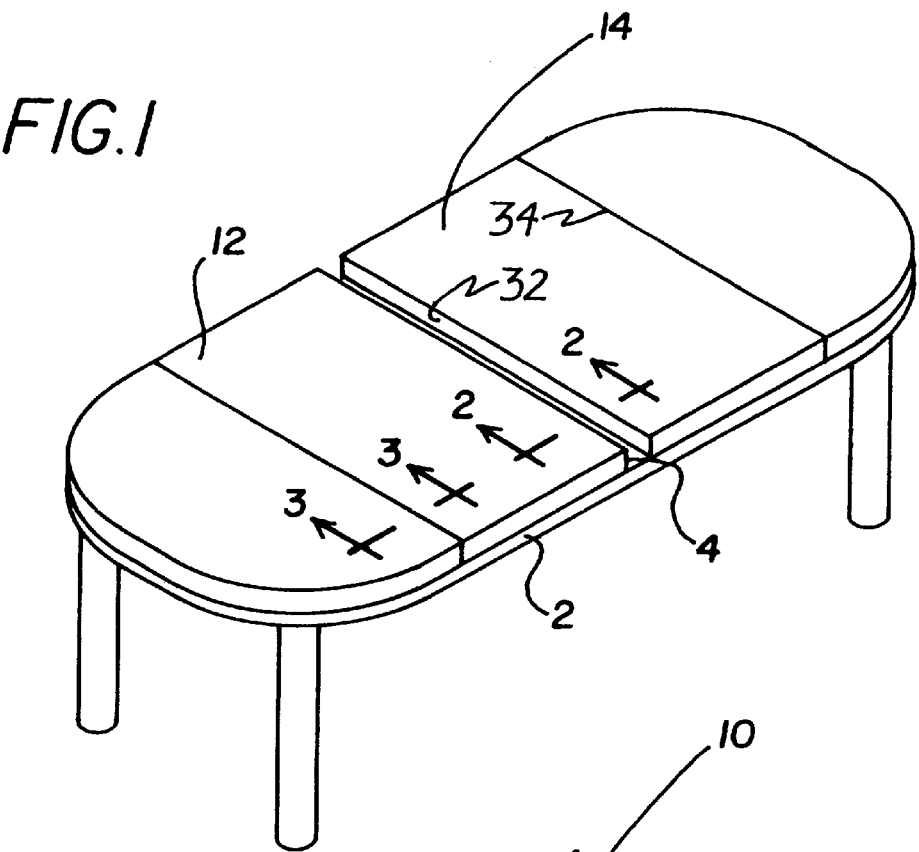
FIG. 1 is a schematic perspective view of a table having on its top surface a tabletop pad comprising a plurality of pad sections with the new magnetic latching system according to the present invention, and illustrating a pair of adjacent pad sections in a spaced condition prior to latching of the adjacent pad sections.
Figure 2:
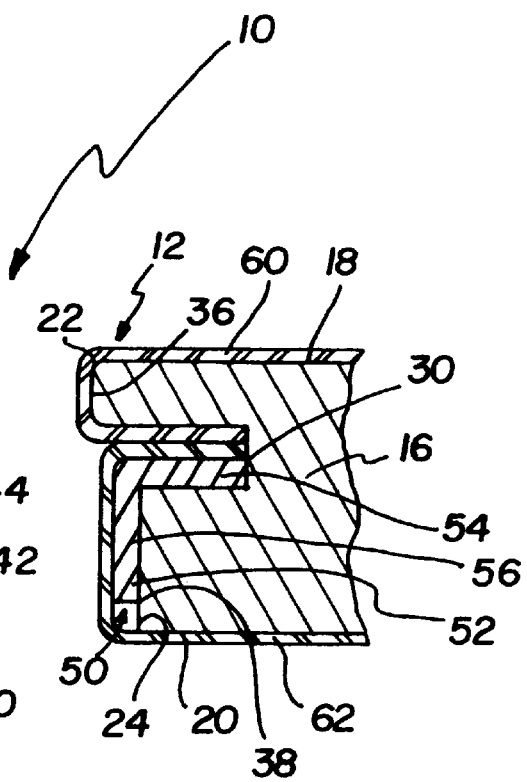
FIG. 2 is a schematic sectional view of a broken away portion of pad sections of the present invention illustrated in a spaced condition, as taken along line 2—2 of FIG. 1.
Figure 3:
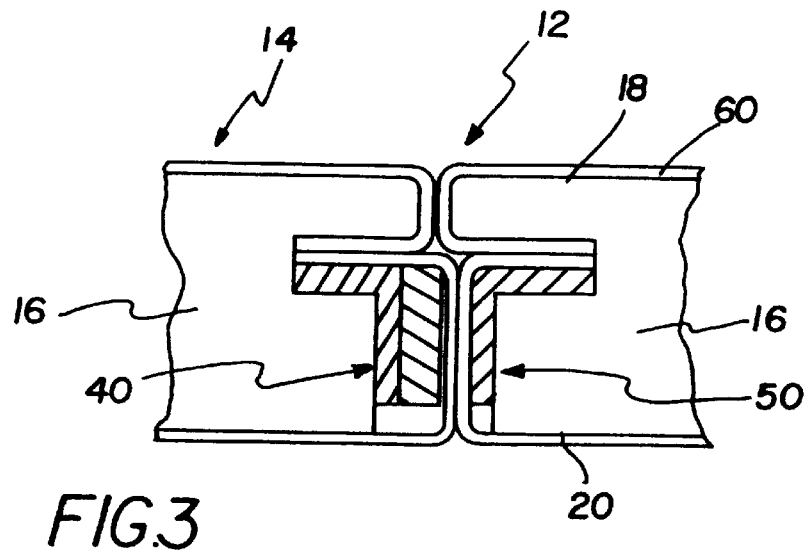
FIG. 3 is a schematic sectional view of a broken away portion of pad sections of the present invention illustrated in an adjacent condition, as taken along line 3—3 of FIG. 1.
Figure 4:
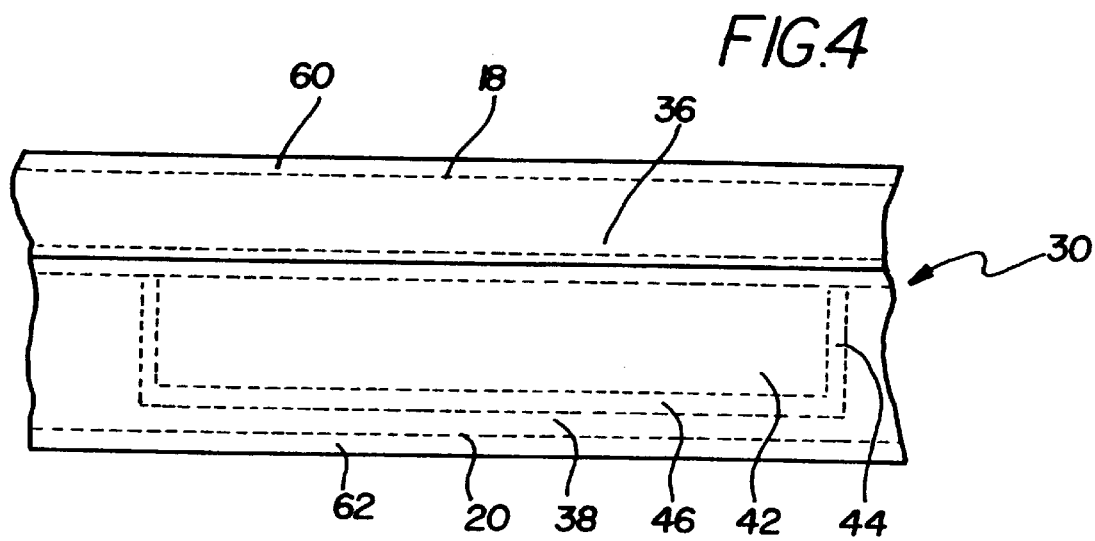
FIG. 4 is a schematic side edge view of a broken away portion of a pad section of the present invention showing the magnetically-active structure of the present invention in phantom lines.
Figure 5:
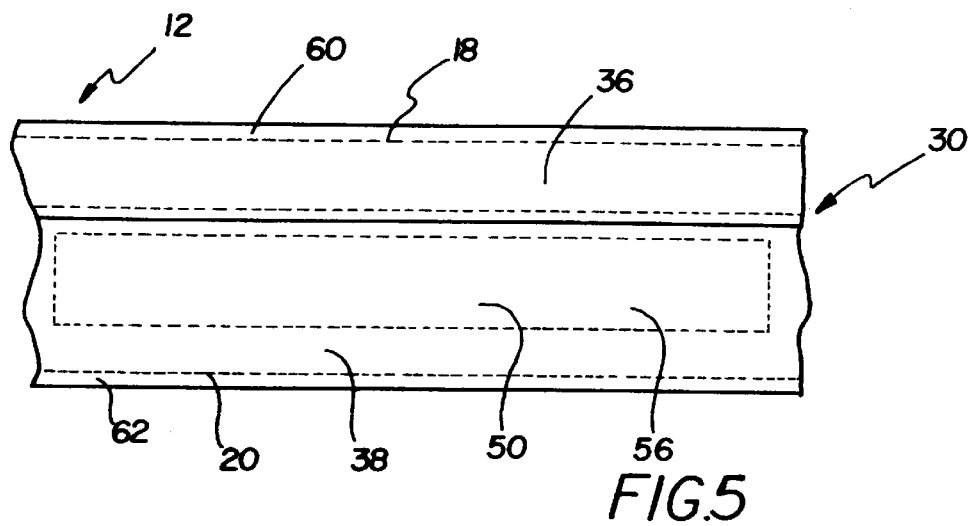
FIG. 5 is a schematic side edge view of a broken away portion of a pad section of the present invention showing the magnetically-receptive structure of the present invention in phantom lines.
Figure 6:
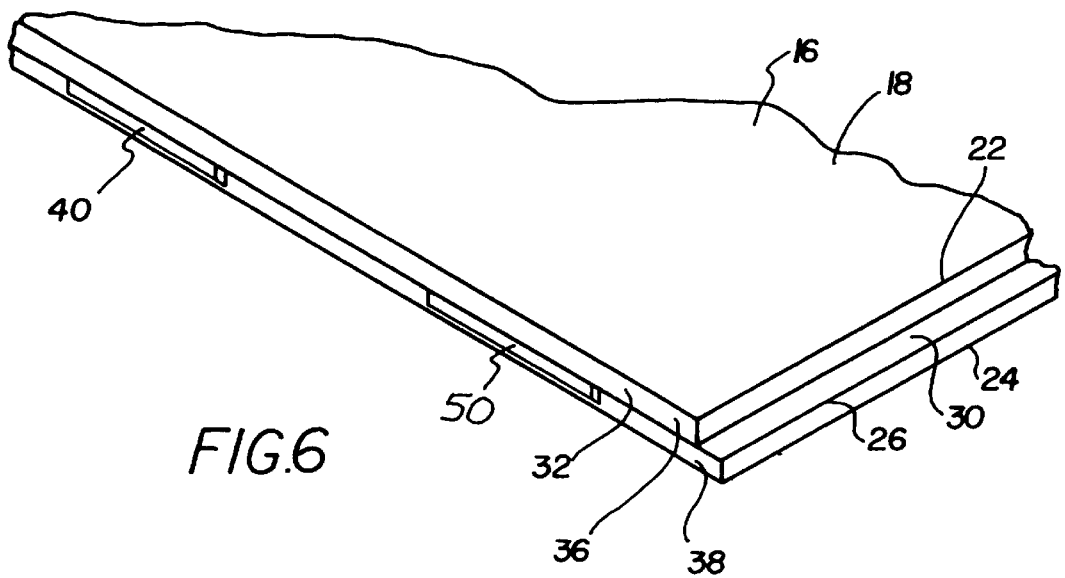
FIG. 6 is a schematic perspective edge view of the present invention with the first and second sheets removed to illustrate a pair of the structures positioned along the perimeter edge face of the base member of the pad section.

With reference now to the drawings, and in particular to FIGS. 1 through 6 thereof, a new magnetic latching system for protective tabletop pads embodying the principles and concepts of the present invention and generally designated by the reference numeral 10 will be described.

As best illustrated in FIGS. 1 through 6, the magnetic latching system for protective tabletop pads 10 generally comprises a tabletop protective pad section 12 for resting on a top surface 4 of a table 2 with at least one other pad section 14 to form a composite tabletop pad which is capable of covering the entire tabletop, while being easily broken down into the constituent sections for easy toting and storage until the next use. Optionally, one or more of the pad sections may have portions that are pivotally coupled together and that may be folded together to further minimize the storage size of the pad section. A plurality of the pad sections rested on the top surface of the table in adjacent positions may form a protective surface above the top surface of the table.

Each of the pad sections of the invention comprises a base member 16 having a first face 18 for facing upward away from the top surface of the tabletop, and a second face 20 for facing downward toward the top surface of the table. The second face is thus rested on the top surface of the table during use. The first and second faces of the base member are oriented substantially parallel to each other. Each of the first and second faces has a perimeter 22, 24, and the base member has a perimeter edge face 26 extending between the perimeters of the first and second faces.

The base member has a groove 30 therein extending along the perimeter edge face in a generally parallel orientation to the perimeters of the first and second faces. A pair of side portions 32, 34 of the perimeter edge face of the base member are oriented generally parallel to each other on opposite sides of the pad section. A first one 32 of the side portions of the perimeter edge face has a first portion of the groove and a second one 34 of the side portions of the perimeter edge face has a second portion of the groove. The groove extends between a first strip 36 and a second strip 38 of the perimeter edge face. The first strip 36 is located adjacent to the first face 18 between the perimeter of the first face and the groove. The second strip 38 is located adjacent to the second face 20 between the perimeter of the second face and the groove. The first strip of the perimeter edge face defines a first plane and the second strip of the perimeter edge face defines a second plane. Optionally, the first plane may extend further from a center of the base member than the second plane such that the first strip protrudes further than the second strip from the pad section for accommodating the structures described in greater detail below.

A magnetically-active structure 40 is mounted on the first side portion 32 of the perimeter edge face of the pad section. The magnetically-active structure 40 may include a magnetically-active member 42 for attracting magnetically-receptive members and a mounting member 44 for mounting the magnetically-active member 42 to the base member. The magnetically-active member is positioned close to the second strip 38 of the perimeter edge face. The magnetically-active member preferably comprises a permanent magnetic material having a high coercivity characteristic to resist demagnetization during normal use. A permanent magnet may be used which is formed of a material with relatively high magnetic energy, product such as, for example, a rapidly quenched neodymium-boron powder metal alloy, an alnico material, or a barium derrite material.

A mounting member 44 may be provided for mounting the magnetic member to the perimeter edge face. The mounting member has a securing portion 46 secured to the magnetically-active member and an anchoring portion 48 attached to the base member. The anchoring portion extends into the groove 30 of the base member. The securing portion is positioned adjacent to the second strip of the perimeter edge face, and the securing portion is secured to the magnetically-active member. The mounting member may comprises an L-shaped member with the securing portion extending from the anchoring portion in a substantially perpendicular relationship. The securing portion of the mounting member extends into the groove, and may be secured in the groove by the installation of the second sheet 62 described below which is adhesively secured in the groove of the base member, although other manners of securing the mounting member may be employed. It will be realized that the magnetically-active member 42 may be attached to the base member directly without the use of a mounting member, although the use of the mounting member is preferred for providing a more secure mounting without having to significantly alter the magnetically-active member for mounting to the base member.

The mounting member 44 comprises a ferromagnetic material, and the ferromagnetic material of the mounting member may comprise a mild steel material, although other materials may also be suitable.

A magnetically-receptive structure 50 is mounted on the second side portion of the perimeter edge face of the base member. The magnetically receptive structure comprises a magnetically-receptive member 52. The magnetically active member is positioned adjacent to the second strip 38 of the perimeter edge face. The magnetically-receptive member may comprise an L-shaped member with a first leg 54 extending into the groove and a second leg 56 extending adjacent to the second strip of the perimeter side face of the base member. The magnetically-receptive member preferably comprises an iron material.

With the aforedescribed structure, the magnetically-receptive structure 50 of the first side portion of a first one 12 of the pad sections is magnetically attracted to the magnetically-active structure 40 of the second side portion of a second one 14 of the pad sections for removably magnetically coupling the first and second pad sections in an adjacent condition.

Preferably, a spaced pair of the structures are provided on each of the side portions of the base member (see FIG. 6) for magnetically engaging a spaced pair of structures on the side portions of another base member. Most preferably, the structures along a side portion are staggered such that a magnetically-active structure 40 and a magnetically-receptive structure 50 are both provided on each of the side portions of the perimeter side edge of the base member, which allows any one or all of the individual pad sections to be reversed on the tabletop yet still permits proper alignment of the magnetically-active and magnetically-receptive structures for magnetically coupling. It will be noted that the relative positions of the structures 40 and 50 on a particular base member need to be reversed on opposite side portions of the perimeter edge, so that adjacent edges of adjacent pad sections have a magnetically-active structure 40 and a magnetically-receptive structure 50 positioned adjacent to each other.

The first face 18 of the base member may be adapted for having relatively hot items rested thereon. A first sheet 60 may extend across and cover the first face of the base member. The first sheet may have a peripheral margin extending into the groove of the perimeter side face for securing the sheet over the first face. The peripheral margin of the first sheet is preferably adhesively secured in the groove. The first sheet preferably comprises a waterproof material, and may comprise a plastic material. Optionally, the plastic material may comprise a vinyl material.

The second face 20 of the base member may be adapted for resting on the top surface of the table without damaging the top surface of the table. A second sheet 62 may extend across and cover the second face of the base member. The second sheet may have a peripheral margin inserted into the groove of the perimeter side face for securing the second sheet over the second face. The peripheral margin of the second sheet is preferably adhesively secured in the groove. The second sheet preferably comprises a low abrasion material, and may comprise, for example, a felt material or a velveteen material.

Significantly, the second sheet encloses the magnetically active structure and the magnetically-receptive structure such that the structures are physically isolated from contact with the top surface of the table when the pad section is rested on the table.

With the second sheet covering the magnetically-active structures and the magnetically-receptive structures, selecting the proper strength of the magnetically-active member is important to permit a secure holding of adjacent pad sections together when placed next to each other on the top surface of the tabletop, while permitting relatively easy separation of the pad sections when it is desired to remove the pad sections from their magnetically latched condition on the tabletop and store the sections.

For example, it can be shown that the attractive force between the magnetically-active member and the magnetically-receptive member is given by $$\text{Force} = (B^2 S)/1.73 \text{ lb.}$$

where B is in kilogauss (kG) and S is in square inches.

The magnetic induction B is continuous throughout the metallic paths. The effective air gap of the magnetic structure is equal to the thickness of the magnetically-active member plus two thickness of the material of the second sheet. By using the demagnetization curve of the magnetic material selected for the magnetically-active member, and plotting a load line on that curve corresponding to the above mentioned air gap, one can determine the magnetic induction B.

A typical design procedure for selecting the magnetically-active member includes selecting a permanent magnetic material to be evaluated, obtaining the demagnetization curve for that material, and drawing a load line with a slope of minus one or $-(l_s/(l+2t))$ through the origin of the curve while taking note of the scales on the horizontal and vertical axes of the demagnetization curve. The procedure includes reading the value of the magnetic induction off of the demagnetization curve where it intersects the load line (the value of the induction will be in kilogausses), substituting this value of the magnetic induction into the above force equation, substituting the face area of the magnet into the above force equation, and evaluating the force equation to determine the force produced by the magnet. If the resulting force value is the value that is desired, the procedure is complete. If a different force is desired than the resulting force value, a different material is chosen, or the area of the magnetically-active member is modified.

As an illustrative example, a magnetically-active member is selected with a thickness of about 0.1 inches. The material of the second sheet may have a thickness of about 0.030 inches, and the effective air gap is 0.860 inches. With this particular geometry, and a neodymium boron permanent magnetic material, it can be shown that an induction of 4.63 kilogausses is obtained. After substitution into the force equation, a result of 12.37S lbs. is obtained. If a magnetically-active member of 0.2 inches wide by 3 inches long is chosen, then the force becomes 7.42 lbs.

By choosing the magnetically-active material, the magnetically-active member surface area and thickness, the force of pull of the magnetically-active structure in a variety of geometric situations can be adjusted. The desired force may ideally be obtained by experimentation on tabletop pad sections of various shapes and sizes.

The material of the base member is preferably resistant to the passage of heat, and is strong enough to withstand normal handling and use of the protective pad sections. Illustratively, a pressed wood fiber material may be used.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tabletop protective pad section for resting on a top surface of a table, the pad section comprising:

a base member having a first face for facing in an upward direction and a second face for facing in a downward direction, the first and second faces being oriented substantially parallel to each other, each of the first and second faces having a perimeter, the base member having a perimeter edge face extending between the perimeters of the first and second faces, a pair of side portions of the perimeter edge face being oriented generally parallel to each other on opposite sides of the base member;

a magnetically-active structure mounted on the first side portion of the perimeter edge face of the base member; and a magnetically-receptive structure mounted on the second side portion of the perimeter edge face;

wherein the magnetically-active structure of the first side portion of a first one of the pad sections is magnetically couplable to the magnetically-receptive structure of the second side portion of a second one of the pad sections for removably holding the first and second pad sections in an adjacent condition.

2. The pad section of claim 1 wherein the base member has a groove therein extending along the perimeter edge face in a generally parallel orientation to the perimeters of the first and second faces.

3. The pad section of claim 2 wherein a first one of the side portions of the perimeter edge face has a first portion of the groove and a second one of the side portions of the perimeter edge face has a second portion of the groove.

4. The pad section of claim 1 wherein the base member has a groove therein extending along the perimeter edge face in a generally parallel orientation to the perimeters of the first and second faces, the groove extending between a first strip and a second strip of the perimeter edge face, the first strip being located adjacent to the first face between the perimeter of the first face and the groove, the second strip being located adjacent to the second face between the perimeter of the second face and the groove.

5. The pad section of claim 4 wherein the first strip of the perimeter edge face defines a first plane and the second strip of the perimeter edge face defines a second plane, the first plane extending further from a center of the base member than the second plane such that the first strip protrudes further than the second strip from the base member.

6. The pad section of claim 1 wherein the magnetically-active structure comprises a magnetically-active member for attracting a magnetically-receptive member, and a mounting member for mounting the magnetic member to the perimeter edge face.

7. The pad section of claim 6 wherein the base member has a groove therein extending along the perimeter edge face in a generally parallel orientation to the perimeters of the first and second faces, and wherein the mounting member has a securing portion secured to the magnetically-active member and the mounting member has an anchoring portion attached to the base member, the anchoring portion extending into the groove, the securing portion being positioned adjacent to the second strip of the perimeter edge face, the mounting member comprising an L-shaped member with the securing portion extending from the anchoring portion in a substantially perpendicular relationship.

8. The pad section of claim 6 wherein the mounting member comprises a ferromagnetic material.

9. The pad section of claim 6 wherein the magnetic member comprises a permanent magnetic material having a high coercivity.

10. The pad section of claim 1 wherein the base member has a groove therein extending along the perimeter edge face in a generally parallel orientation to the perimeters of the first and second faces, and wherein the magnetically receptive structure comprises a magnetically-active member, the magnetically active member being positioned adjacent to the second strip of the perimeter edge face, the magnetically-receptive member comprising an L-shaped member with a first leg extending into the groove and a second leg extending adjacent to the second strip of the perimeter side face, the magnetically-receptive member comprising iron.

11. The pad section of claim 1 wherein the base member has a groove therein extending along the perimeter edge face in a generally parallel orientation to the perimeters of the first and second faces, and wherein the first face of the base member is adapted for having relatively hot items rested thereon, a first sheet covering the first face, the first sheet comprising a waterproof material.

12. The pad section of claim 11 wherein the first sheet has a peripheral margin extending into the groove of the perimeter side face for securing the sheet over the first face, the peripheral margin of the first sheet being adhesively secured in the groove.

13. The pad section of claim 11 wherein the waterproof material of the first sheet is comprises a plastic, wherein the waterproof material of the first sheet comprises a vinyl material.

14. The pad section of claim 1 wherein the base member has a groove therein extending along the perimeter edge face in a generally parallel orientation to the perimeters of the first and second faces, and wherein the second face of the base member is adapted for resting on the top surface of the table without damaging the top surface of the table, a second sheet covering the second face, the second sheet comprising a low abrasion material.

15. The pad section of claim 14 wherein the second sheet has a peripheral margin inserted into the groove of the perimeter side face for securing the second sheet over the second face, the peripheral margin of the second sheet being adhesively secured in the groove.

16. The pad section of claim 14 wherein the low abrasion material of the second sheet comprises a felt material.

17. The pad section of claim 14 wherein the soft material comprises a velveteen material.

18. The pad section of claim 14 wherein the second sheet encloses the magnetically active structure and the magnetically-receptive structure such that the structures are physically isolated from contact with the top surface of the table when the pad section is rested on the table.

19. A tabletop protective pad for resting on a top surface of a table, the protective pad comprising:
a plurality of pad sections for resting on the top surface of the table in adjacent positions for forming a surface above the top surface of the table, each of the pad sections comprising:
a base member having a first face and a second face for orienting toward the top surface of the table, the first and second faces being oriented substantially parallel to each other, each of the first and second faces having a perimeter, the base member having a perimeter edge face extending between the perimeters of the first and second faces, the base member having a groove therein extending along the perimeter edge face in a generally parallel orientation to the perimeters of the first and second faces, a pair of side portions of the perimeter edge face being oriented generally parallel to each other on opposite sides of the pad section, a first one of the side portions of the perimeter edge face having a first portion of the groove and a second one of the side portions of the perimeter edge face having a second portion of the groove, the groove extending between a first strip and a second strip of the perimeter edge face, the first strip being located adjacent to the first face between the perimeter of the first face and the groove, the second strip being located adjacent to the second face between the perimeter of the second face and the groove, the first strip of the perimeter edge face defining a first plane and the second strip of the perimeter edge face defining a second plane, the first plane extending further from a center of the pad section than the second plane such that the first strip protrudes further than the second strip from the pad section;

a magnetically-active structure mounted on the first side portion of the perimeter edge face of the pad section, the magnetically-active structure comprising:
a magnetically-active member for attracting magnetically-receptive members, the magnetic member being positioned close to the second strip of the perimeter edge face, wherein the magnetic member comprises a permanent magnetic material having a high coercivity;
a mounting member for mounting the magnetic member to the perimeter edge face, the mounting member having a securing portion secured to the magnetically-active member and an anchoring portion attached to the base member, the anchoring portion extending into the groove, the securing portion being positioned adjacent to the second strip of the perimeter edge face, the mounting member comprising an L-shaped member with the securing portion extending from the anchoring portion in a substantially perpendicular relationship, the mounting member comprising a ferromagnetic material, the ferromagnetic material of the mounting member comprising a mild steel material;

a magnetically-receptive structure mounted on the second side portion of the perimeter edge face, the magnetically receptive structure comprising a magnetically-active member, the magnetically active member being positioned adjacent to the second strip of the perimeter edge face, the magnetically-receptive member comprising an L-shaped member with a first leg extending into the groove and a second leg extending adjacent to the second strip of the perimeter side face, the magnetically-receptive member comprising iron;

wherein the magnetically-active structure of the first side portion of a first one of the pad sections is attracted the magnetically-receptive structure of the second side portion of a second one of the pad sections for removably holding the first and second pad sections in an adjacent condition;

wherein the first face of the base member is adapted for having relatively hot items rested thereon, a first sheet covering the first face, the first sheet comprising a waterproof material, the first sheet having a peripheral margin extending into the groove of the perimeter side face for securing the sheet over the first face, the peripheral margin of the first sheet being adhesively secured in the groove, wherein the waterproof material of the first sheet is comprises a plastic, wherein the waterproof material of the first sheet comprises a vinyl material;

wherein the second face of the base member is adapted for resting on the top surface of the table without damaging the top surface of the table, a second sheet covering the second face, the second sheet comprising a low abrasion material, the second sheet having a peripheral margin inserted into the groove of the perimeter side face for securing the second sheet over the second face, the peripheral margin of the second sheet being adhesively secured in the groove, wherein the low abrasion material of the second sheet comprises a felt material, wherein the soft material comprises a velveteen material, wherein the second sheet encloses the magnetically active structure and the magnetically-receptive structure such that the structures are physically isolated from contact with the top surface of the table when the pad section is rested on the table.

* * * * *